United States Patent
Schwindt et al.

(10) Patent No.: US 12,409,851 B2
(45) Date of Patent: Sep. 9, 2025

(54) SENSOR PLUGIN ARCHITECTURE FOR GRID MAP

(71) Applicant: Robert Bosch GmbH, Stuttgart (DE)

(72) Inventors: Oliver F. Schwindt, Sunnyvale, CA (US); Stephan Reuter, Bavaria (DE); Christos Zalidis, Mountain View, CA (US); Tobias Berling, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 230 days.

(21) Appl. No.: 18/064,071

(22) Filed: Dec. 9, 2022

(65) Prior Publication Data

US 2024/0190461 A1    Jun. 13, 2024

(51) Int. Cl.
*B60W 60/00* (2020.01)
*B60W 40/02* (2006.01)
(Continued)

(52) U.S. Cl.
CPC .......... *B60W 60/001* (2020.02); *B60W 40/02* (2013.01); *G01S 7/40* (2013.01);
(Continued)

(58) Field of Classification Search
CPC .............. B60W 60/001; B60W 40/02; B60W 2420/408; B60W 2556/40; G01S 7/40;
(Continued)

(56) References Cited

U.S. PATENT DOCUMENTS 9,996,944 B2   6/2018   Aghamohammadi et al.
10,152,056 B2   12/2018   Rohde et al.
(Continued)

FOREIGN PATENT DOCUMENTS

DE   102019129463 A1   5/2021
DE   102020119954 A1   2/2022

OTHER PUBLICATIONS

F. M. Moreno, O. El-Sobky, F. Garcia and J. M. Armingol, "Hypergrid: A Hyper-Fast ROS-Based Framework for Local Map Generation," 2019 IEEE International Conference on Vehicular Electronics and Safety (ICVES), Cairo, Egypt, 2019, pp. 1-6, doi: 10.1109/ICVES.2019.8906334. (Year: 2019).*

*Primary Examiner* — Anne Marie Antonucci
*Assistant Examiner* — Jordan T Smith
(74) *Attorney, Agent, or Firm* — Michael Best & Friedrich LLP (57) ABSTRACT

Systems and methods for controlling an autonomous vehicle. One system includes an electronic processor and a memory configured to store a multi-layer grid and a multi-instanceable sensor plugin. The multi-layer grid includes information associated with positions in the environment. A plurality of sensors are configured to output sensor information. The electronic processor is configured to, for each of the plurality of sensors, determine a modality of the sensor and generate an instance of the sensor plugin based on the modality. The electronic processor receives, processes, and determines a plausibility of the sensor information. In response to determining that the sensor information is plausible, the electronic processor integrates the sensor information to the multi-layer grid. The electronic processor controls vehicle movement based on the multi-layer grid.

20 Claims, 3 Drawing Sheets

(51) Int. Cl.
*G01S 7/40* (2006.01)
*G01S 7/497* (2006.01)
*G01S 13/89* (2006.01)
*G01S 13/931* (2020.01)
*G01S 17/89* (2020.01)
*G01S 17/931* (2020.01)

(52) U.S. Cl.
CPC .............. *G01S 7/497* (2013.01); *G01S 13/89* (2013.01); *G01S 13/931* (2013.01); *G01S 17/89* (2013.01); *G01S 17/931* (2020.01); *B60W 2420/408* (2024.01); *B60W 2556/40* (2020.02)

(58) Field of Classification Search
CPC ........ G01S 7/497; G01S 13/89; G01S 13/931; G01S 17/89; G01S 17/931; G01S 13/87; G01S 7/4972; G01S 13/865; G01S 13/867; G06V 20/56
See application file for complete search history.

(56) References Cited

U.S. PATENT DOCUMENTS

| | | | |
|---|---|---|---|
| 10,296,001 B2 | 5/2019 | Smith et al. | |
| 10,445,928 B2 | 10/2019 | Nehmadi et al. | |
| 10,532,740 B2 | 1/2020 | Sorstedt et al. | |
| 10,955,855 B1 | 3/2021 | Tran | |
| 11,158,120 B1 | 10/2021 | Jespersen et al. | |
| 11,163,309 B2 | 11/2021 | Ta et al. | |
| 11,315,317 B2 | 4/2022 | Yu et al. | |
| 2018/0120842 A1* | 5/2018 | Smith | G01S 7/412 |
| 2018/0173232 A1 | 6/2018 | Schwindt et al. | |
| 2018/0285658 A1* | 10/2018 | Günther | G08G 1/166 |
| 2019/0236865 A1* | 8/2019 | Mercep | B60W 50/0205 |
| 2020/0209857 A1 | 7/2020 | Djuric et al. | |
| 2020/0225622 A1 | 7/2020 | Buerkle et al. | |
| 2020/0249326 A1 | 8/2020 | Bhaskaran et al. | |
| 2020/0283028 A1 | 9/2020 | Oba | |
| 2020/0334887 A1* | 10/2020 | Salfity | G05D 1/0248 |
| 2020/0370920 A1 | 11/2020 | Ahmed et al. | |
| 2021/0101624 A1* | 4/2021 | Philbin | G06F 18/251 |
| 2021/0131823 A1 | 5/2021 | Giorgio et al. | |
| 2021/0323572 A1 | 10/2021 | He et al. | |
| 2021/0342599 A1 | 11/2021 | Walls et al. | |
| 2021/0347378 A1 | 11/2021 | Nabatchian et al. | |
| 2022/0194412 A1* | 6/2022 | Zhang | G06V 20/56 |
| 2022/0398851 A1* | 12/2022 | Nehmadi | G01S 17/931 |
| 2023/0145218 A1* | 5/2023 | Murray | G01S 13/931 701/24 |
| 2023/0192094 A1* | 6/2023 | Jia | G06F 18/25 701/25 |
| 2023/0192145 A1* | 6/2023 | Das | G01S 13/865 |
| 2023/0206755 A1* | 6/2023 | Jha | H04W 4/38 340/425.5 |
| 2024/0241258 A1* | 7/2024 | Kim | G01S 17/931 |

* cited by examiner

SENSOR PLUGIN ARCHITECTURE FOR GRID MAP

FIELD

Embodiments, examples, and aspects herein relate to, among other things, a system and method for an autonomous vehicle with a plurality of sensors.

SUMMARY

Autonomous vehicles and driver assistance functions may rely on grid maps storing probabilistic information relating to features of an environment in order to control vehicle movement in the environment. Various sensors in the autonomous vehicle output sensor information that is fused into the grid maps. At least some of these sensors may have different characteristics and sensor-specific properties. Therefore, it is desirable to process sensor information output by the sensors prior to integration of the sensor information into a grid map to normalize or standardize the sensor information. Examples herein provide a sensor plugin architecture for preparing sensor information for integration to a grid map.

One example provides a system for an autonomous vehicle. The system includes a memory configured to store a multi-layer grid and a multi-instanceable sensor plugin, wherein the multi-layer grid includes information associated with positions in an environment, and a plurality of sensors each configured to output sensor information. The system also includes an electronic processor configured to, for each sensor included in the plurality of sensors, determine a modality of the sensor, generate an instance of the sensor plugin based on the modality, receive the sensor information, process the sensor information with the instance of the sensor plugin, determine a plausibility of the sensor information, and in response to determining that the sensor information is plausible, integrate the sensor information to a layer of the multi-layer grid, wherein the electronic processor is further configured to control vehicle movement based on the multi-layer grid.

In some instances, the electronic processor is configured to process the sensor information with the instance of the sensor plugin by determining a mounting position of the sensor, and processing the sensor information based on the mounting position.

In some instances, the sensor information is associated with a position in the environment, the multi-layer grid includes an occupancy layer, the occupancy layer including occupancy information, and the electronic processor is configured to determine the plausibility of the sensor information based on the occupancy information associated with the position in the environment and the modality of the sensor.

In some instances, one of the plurality of sensors comprises at least one selected from a group consisting of a radar sensor and a lidar sensor, and the electronic processor is configured to in response to determining the sensor modality is radar or lidar, process the sensor information with the instance of the sensor plugin by performing ray-tracing to determine that the sensor information is associated with a reflection, and in response to determining that the sensor information is associated with a reflection, identify an object in the environment as a source of the reflection.

In some instances, one of the plurality of sensors comprises a radar sensor, and the electronic processor is configured to in response to determining the sensor modality is radar, process the sensor information with the instance of the sensor plugin by determining a radial velocity of an object sensed by the radar sensor, and in response to determining the radial velocity is greater than a threshold, integrate the sensor information into a dynamic layer of the multi-layer grid.

In some instances, one of the plurality of sensors comprises a camera, and the electronic processor is configured to in response to determining the sensor modality is video, process the sensor information with the instance of the sensor plugin by determining a distance inaccuracy of the sensor information output by the camera, and determine the plausibility based on the distance inaccuracy.

In some instances, the electronic processor is configured to determine a mounting position of the sensor, determine a calibration error for the sensor based on the mounting position, wherein the calibration error is based on at least one selected from the group consisting of a change in azimuth angle and a change in elevation angle, and recalibrate the sensor based on the calibration error.

In some instances, the electronic processor is configured to generate a private grid layer for each instance of the sensor plugin, integrate subsequent cycles of sensor information into the private grid layer, and process the sensor information based on sensor information associated with a previous cycle.

In some instances, the sensor is one selected from a group consisting of a radar sensor, a lidar sensor, and a camera.

Another example provides a method for operating an autonomous vehicle. The method includes storing, in a memory, a multi-layer grid and a multi-instanceable sensor plugin, wherein the multi-layer grid includes information associated with positions in an environment; outputting, with a plurality of sensors, sensor information; with an electronic processor and for each sensor included in the plurality of sensors: determining a modality of the sensor, generating an instance of the sensor plugin based on the modality, receiving the sensor information, processing the sensor information with the instance of the sensor plugin, determining a plausibility of the sensor information, and in response to determining that the sensor information is plausible, integrating the sensor information to a layer of the multi-layer grid. The method also includes controlling, with the electronic processor, vehicle movement based on the multi-layer grid.

In some instances, processing the sensor information with the instance of the sensor plugin includes determining a mounting position of the sensor, and processing the sensor information based on the mounting position.

In some instances, the sensor information is associated with a position in the environment, the multi-layer grid includes an occupancy layer, the occupancy layer including occupancy information, and the method includes determining the plausibility of the sensor information based on the occupancy information associated with the position in the environment and the modality of the sensor.

In some instances, the method includes one of the plurality of sensors comprises at least one selected from a group consisting of a radar sensor and a lidar sensor, and the method includes in response to determining the sensor modality is radar or lidar, processing the sensor information with the instance of the sensor plugin by performing ray-tracing to determine that the sensor information is associated with a reflection, and in response to determining that the sensor information is associated with a reflection, identifying an object in the environment as a source of the reflection.

In some instances, one of the plurality of sensors comprises a radar sensor, and the method includes in response to determining the sensor modality is radar, processing the sensor information with the instance of the sensor plugin by determining a radial velocity of an object sensed by the radar sensor, and in response to determining the radial velocity is greater than a threshold, integrating the sensor information into a dynamic layer of the multi-layer grid.

In some instances, one of the plurality of sensors comprises a camera, and the method includes in response to determining the sensor modality is video, processing the sensor information with the instance of the sensor plugin by determining a distance inaccuracy of the sensor information output by the camera, and determining the plausibility based on the distance inaccuracy.

In some instances, the method includes determining, with the electronic processor, a mounting position of the sensor, determining a calibration error for the sensor based on the mounting position, wherein the calibration error is based on at least one selected from the group consisting of a change in azimuth angle and a change in elevation angle, and recalibrating the sensor based on the calibration error.

In some instances, the method includes generating a private grid layer for each instance of the sensor plugin, integrating subsequent cycles of sensor information into the private grid layer, and processing the sensor information based on sensor information associated with a previous cycle.

In some instances, the sensor is one selected from a group consisting of a radar sensor, a lidar sensor, and a camera.

In some instances, processing the sensor information with the instance of the sensor plugin includes time-filtering the sensor information.

DETAILED DESCRIPTION

Before any aspects, features, or instances are explained in detail, it is to be understood that the aspects, features, or instances are not limited in their application to the details of construction and the arrangement of components set forth in the following description or illustrated in the following drawings. Other instances are possible and are capable of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software based devices, as well as a plurality of different structural components may be utilized to implement the invention. For example, "control units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only. In some instances, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

Autonomous vehicles and driver assistance functions may rely on grid maps storing probabilistic information relating to features of an environment in order to control vehicle movement in the environment. Grid maps include a set of cells associated with respective positions in the environment surrounding a vehicle. The cells, which may be 2D cells or 3D voxels, include occupancy information relating to static or dynamic features of the environment. The occupancy information may include sensor measurements of the features, occupancy probabilities of corresponding positions in the environment, and free-space probabilities of corresponding positions in the environment.

Static features are stationary features of the environment. Static features include, for example, road markings, guard rails, curbs, a type of ground surface (e.g., grass, gravel, asphalt), ground elevation, buildings, sidewalks, parked vehicles, construction site equipment, trash collection bins, and under-drivable structures (e.g., bridges, overhanging signs, overhanging wires). Dynamic features are non-stationary features of the environment. Dynamic features include, for example, pedestrians, moving vehicles, and animals.

In some instances, grid maps are single layer maps or multi-layer grid maps, wherein each layer comprises a set of cells storing information relating to a type of feature. For example, the multi-layer grid may include an occupancy layer, such as a static occupancy layer and/or a dynamic occupancy layer. In some instances, the multi-layer grid further includes a ground surface layer and a road marking layer. The ground surface layer may include information relating to ground semantics, such as ground elevation, ground surface type (e.g., grass, asphalt, gravel), or ground surface friction. The road marking layer may include information relating to road markings, detour signage, or traffic flow.

Sensors of various modalities and mounting arrangements in the autonomous vehicle output sensor information that is fused into the grid map. At least some of these sensors may have different characteristics and sensor-specific properties. Therefore, it is desirable to process sensor information output by the sensors prior to integration of the sensor information into the multi-layer grid to normalize or standardize the sensor information. Examples herein provide a sensor plugin architecture for preparing sensor information for integration to a multi-layer grid map. Although examples are described with respect to a multi-layer grid map, methods and systems described herein can be used with multi-layer grid maps or single-layer grid maps.

Figure 1:
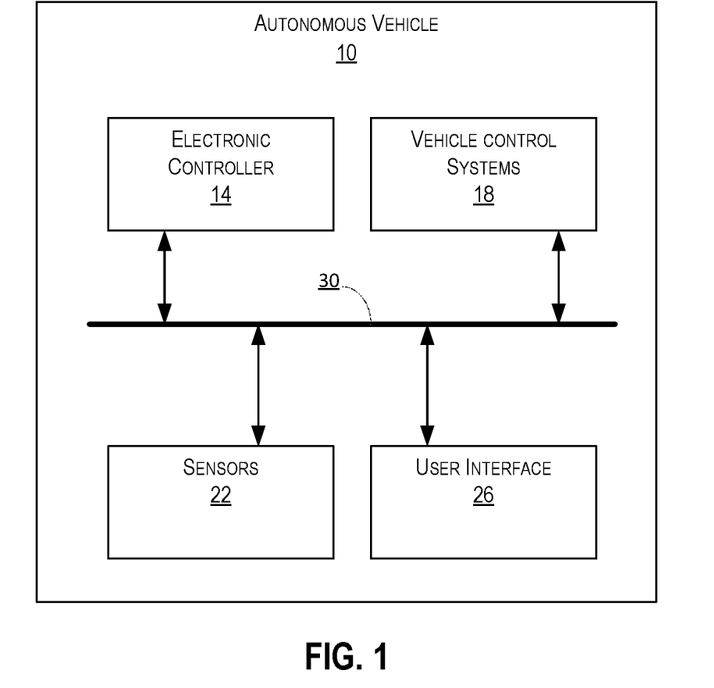
FIG. 1 schematically illustrates an autonomous vehicle, according to some aspects.

FIG. 1 schematically illustrates an autonomous vehicle 10. In the illustrated example, the autonomous vehicle 10 includes an electronic controller 14, a plurality of vehicle control systems 18, a plurality of sensors 22, and a user interface 26. The components of the autonomous vehicle 10, along with other various modules and components are electrically and communicatively coupled to each other via direct connections or by or through one or more control or data buses (for example, the bus 30), which enable communication therebetween. The use of control and data buses for the interconnection between, and communication among, the various modules and components would be known to a person skilled in the art in view of the invention described herein. In some instances, the bus 30 is a Controller Area Network (CAN™) bus. In some instances, the bus 30 is an automotive Ethernet™, a FlexRay™ communications bus, or another suitable bus. In alternative instances, some or all of the components of the autonomous vehicle 10 may be communicatively coupled using suitable wireless modalities (for example, Bluetooth™ or near field communication connections).

The electronic controller 14 (described in greater detail below with respect to FIG. 2) communicates with the vehicle control systems 18 and the sensors 22. The electronic controller 14 may receive sensor data from the sensors 22 and determine control commands for the autonomous vehicle 10. The electronic controller 14 transmits the control commands to, among other things, the vehicle control systems 18 to operate or assist in operating the autonomous vehicle 10 (for example, by generating braking signals, acceleration signals, steering signals, or the like). In some instances, the electronic controller 14 is part of one or more vehicle controllers that implement autonomous or partially autonomous control of the autonomous vehicle 10.

The vehicle control systems 18 may include controllers, actuators, and the like for controlling operation of the autonomous vehicle 10 (for example, acceleration, braking, shifting gears, and the like). The vehicle control systems 18 communicate with the electronic controller 14 via the bus 30.

The sensors 22 determine one or more attributes of the autonomous vehicle 10 and its surrounding environment and communicate information regarding those attributes to other components of the autonomous vehicle 10 using, for example, messages transmitted on the bus 30. The sensors 22 may include, for example, vehicle control sensors, such as, for example, sensors that detect accelerator pedal position and brake pedal position, wheel speed sensors, vehicle speed sensors, yaw, pitch, and roll sensors, force sensors, and vehicle proximity sensors (for example, imaging devices and ultrasonic sensors). In some instances, the sensors 22 include one or more cameras or other imaging devices configured to capture one or more images of the environment surrounding the autonomous vehicle 10. Radar and LiDAR sensors may also be used. The sensors 22 may each include an electronic processor configured to process raw sensor data before outputting sensor information to other components of the autonomous vehicle 10, such as the electronic controller 14.

In some instances, the electronic controller 14 controls aspects of the autonomous vehicle 10 based on commands received from the user interface 26. The user interface 26 provides an interface between the components of the autonomous vehicle 10 and an occupant (for example, a driver) of the autonomous vehicle 10. The user interface 26 is configured to receive input from the occupant, receive indications of vehicle status from the system's controllers (for example, the electronic controller 14), and provide information to the driver based on the received indications. The user interface 26 provides visual output, such as, for example, graphical indicators (for example, fixed or animated icons), lights, colors, text, images, combinations of the foregoing, and the like. The user interface 26 includes a suitable display mechanism for displaying the visual output, such as, for example, a liquid crystal display (LCD) touch screen, or an organic light-emitting diode (OLED) touch screen), or other suitable mechanisms. In some instances, the user interface 26 displays a graphical user interface (GUI) (for example, generated by the electronic controller 14 and presented on a display screen) that enables a driver or passenger to interact with the autonomous vehicle 10. The user interface 26 may also provide audio output to the driver via a chime, buzzer, speaker, or other suitable device included in the user interface 26 or separate from the user interface 26. In some instances, user interface 26 provides haptic outputs to the driver by vibrating one or more vehicle components (for example, the vehicle's steering wheel, a seat, or the like), for example, using a vibration motor. In some instances, the user interface 26 provides a combination of visual, audio, and haptic outputs.

Figure 2:
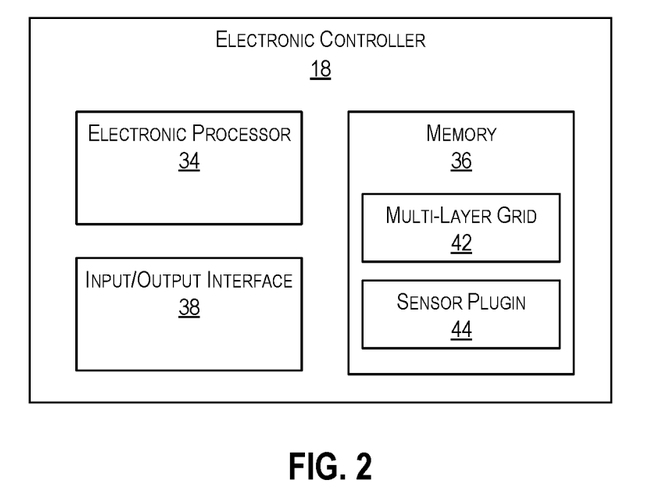
FIG. 2 schematically illustrates an electronic controller for an autonomous vehicle, according to some aspects.

FIG. 2 illustrates an example of the electronic controller 14, which includes an electronic processor 34 (for example, a microprocessor, application specific integrated circuit, etc.), a memory 36, and an input/output interface 38. The memory 36 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 34 is coupled to the memory 36 and the input/output interface 38. The electronic processor 34 sends and receives information (for example, from the memory 36 and/or the input/output interface 38) and processes the information by executing one or more software instructions or modules, capable of being stored in the memory 36, or another non-transitory computer readable medium. The software can include firmware, one or more applications, program data, filters, rules, one or more program modules, and other executable instructions. The electronic processor 34 is configured to retrieve from the memory 36 and execute, among other things, software for performing methods as described herein. In the example illustrated, the memory 36 stores, among other things, a multi-layer grid 42 for storing information associated with positions in an environment surrounding the autonomous vehicle 10. The memory also stores a multi-instanceable sensor plugin 44. The input/output interface 38 transmits and receives information from devices external to the electronic controller 14 (for example, components of the autonomous vehicle 10 via the bus 30).

Figure 3:
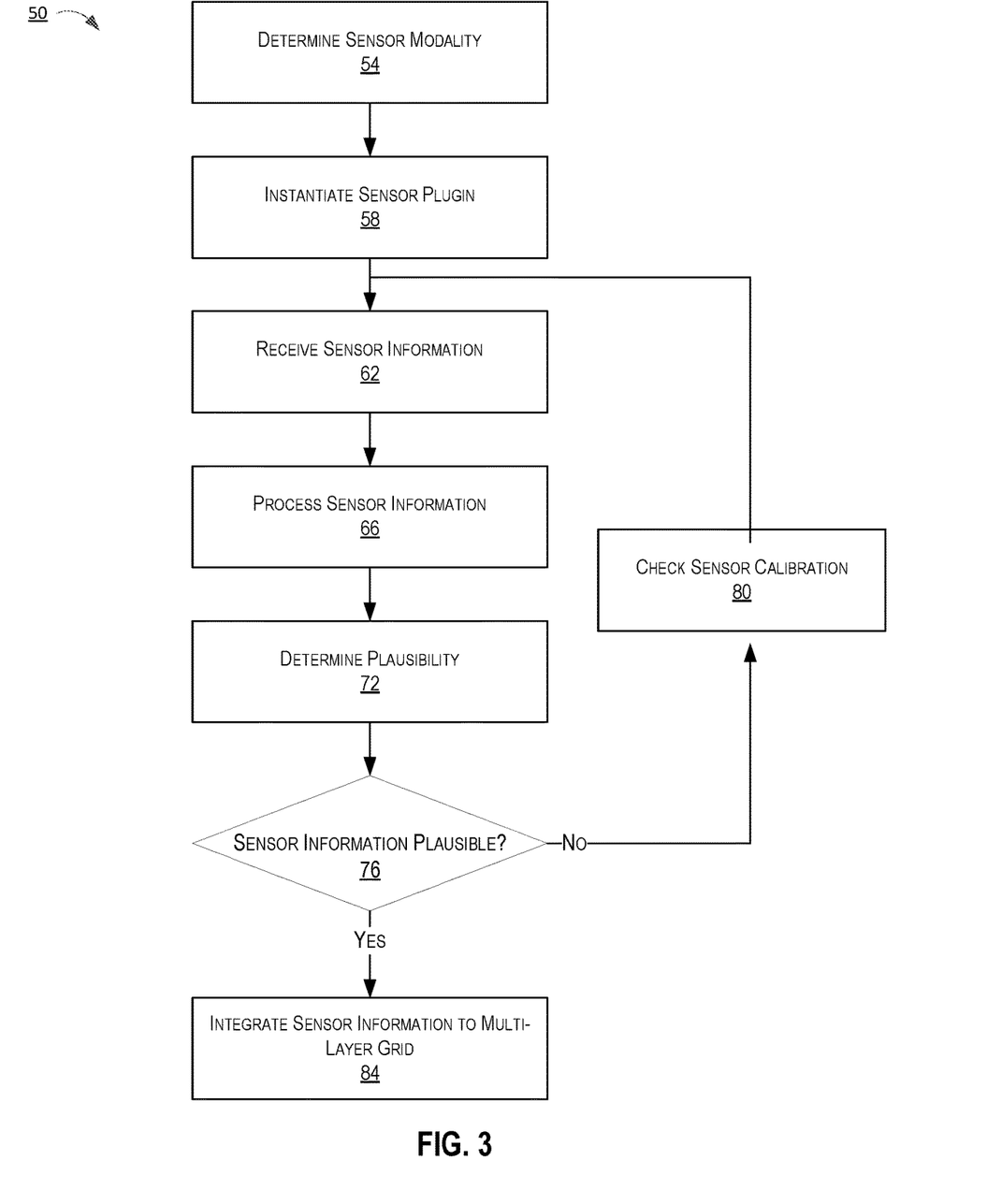
FIG. 3 illustrates an example method for controlling an autonomous vehicle, according to some aspects.

FIG. 3 is a flowchart illustrating an example method 50 executed by the electronic processor 34 for integrating sensor information from an individual sensor 22 to the multi-layer grid 42. Some of the method blocks of the method 50 are described below with reference to the electronic processor 34, however, these blocks may be implemented in the autonomous vehicle 10 in any appropriate matter (for example, on the central processing unit or the graphics processing unit). Additionally, it should be understood that in some instances a "sensor" includes both sensing components and processing components (for example, a microprocessor) and, as a consequence, the sensor processes raw information or data and generates determinations. In general, whenever the term sensor is used it should be understood that the sensor may include both sensing and processing components and may be configured to generate data in particular formats, determinations regarding sensed phenomena, or other processed outputs.

Each block in the method 50 is illustrated once each and in a particular order, however, the blocks of the method 50 may be reordered and repeated as appropriate. Additionally, any operations in the method 50 and may be performed in parallel with each other as appropriate and as desired. The electronic processor 34 is configured to execute the blocks of the method 50 for each of the plurality of sensors 22 (for example, in parallel or serially). Accordingly, the method 50 is described below with respect to a single sensor 22.

At block 54, the electronic processor 34 determines a modality of the sensor 22. The electronic processor 34 may determine the modality of the sensor 22 by any suitable means, such as, for example, based on a message received from the sensor 22, based on the format of data output by the sensor 22, based on sensor configuration information stored in the memory 36 or a different memory, or a combination thereof. For example, the electronic processor 34 may determine that the sensor 22 is a radar sensor, a LiDAR sensor, a video sensor (e.g., a camera), or any other environment-perceiving sensor. At block 58, the electronic processor 34 generates an instance of the multi-instanceable sensor plugin 44 according to the determined modality. For example, the electronic processor 34 may instantiate the sensor plugin 44 with a set of parameters dependent on sensor-specific characteristics of the sensor 22. The electronic processor 34 may access stored data, such as, for example, one or more look-up tables, mappings, rules, unique identifiers or names of a sensor 22, or a combination thereof, that define a set of parameters for a particular modality or type of sensor. In some instances, the electronic processor 34 determines a mounting position of the sensor 22 in the autonomous vehicle 10 (based on stored data, detected data, or a combination thereof) and instantiates the sensor plugin 44 based on the determined mounting position.

During operation of the autonomous vehicle 10, the sensor 22 measures features of the environment surrounding the autonomous vehicle 10, and outputs sensor information. At block 62, the electronic processor 34 receives the sensor information from the sensor 22. In some instances, the sensor information is not raw sensor data, but rather is sensor data that has undergone initial processing by an electronic processor included in the sensor 22 or by another electronic processor included in the autonomous vehicle 10. At block 66, the electronic processor 34 provides the sensor information as input to the sensor plugin 44, and the sensor plugin 44 processes the sensor information. The electronic processor 34 may use stored data regarding instantiated plug-ins, which the electronic processor 34 uses to route sensor information to the appropriate plug-in. Processing the sensor information with the sensor plugin 44 may optionally include time-filtering (e.g., with a Kalman filter) the sensor information. Processing the sensor information with the sensor plugin 44 may further include spatially transforming the sensor information based on the determined mounting position of the sensor 22. Additional examples of processing the sensor information with the sensor plugin 44 will be described below with respect to FIG. 4.

At block 72, the electronic processor 34, such as, for example, as part of the processing performed via the appropriate plug-in, determines one or more plausibilities of the sensor information. The one or more plausibilities indicate a probability that some or all of the sensor information accurately represents the environment surrounding the autonomous vehicle 10. For example, a plausibility may be represented by a numeric value within a range (e.g., a value between 0 and 10), a percentage, a Boolean value, or any other suitable representation of probability. In some instances, the electronic processor 34 determines the plausibility based on feedback received from the multi-layer grid 42. For example, in response to the sensor information indicating that the sensor 22 detected an object at a position in the environment, the electronic processor 34 may compare the sensor information with a cell in the multi-layer grid 42 associated with the position in the environment. In response to the cell indicating a high occupancy probability of an object matching the object detected by the sensor 22, the electronic processor 34 determines that the sensor information has a higher plausibility than if the cell did not indicate a high occupancy probability of the object. In some instances, the electronic processor 34 determines, based on the comparison, that the sensor information represents a ghost object, for example, caused by a reflection.

At block 76, the electronic processor 34 determines, based on the plausibility, whether the sensor information is sufficiently plausible. For example, the electronic processor 34 may compare the plausibility to a threshold value. In response to the electronic processor 34 determining that the sensor information is not plausible, the method 50 proceeds to block 80. At block 80, the electronic processor 34 checks the calibration of the sensor 22 for calibration errors. In response to determining a calibration error of the sensor 22, the electronic processor 34 recalibrates the sensor 22 based on the calibration error. The calibration error may be a result of a change in the mounting position of the sensor 22 (e.g., a change in azimuth or elevation angle), a change in internal or ambient temperature of the sensor 22, or damage to the autonomous vehicle 10.

In contrast, in response to the electronic processor 34 determining, at block 76, that the sensor information is plausible, the method 50 proceeds to block 84. At block 84, the electronic processor 34 integrates the sensor information into the multi-layer grid 42. The electronic processor 34 may modify the sensor information prior to integration to the multi-layer grid 42. In some instances, the electronic processor 34 only integrates a portion of the sensor information (e.g., a portion of the sensor information that is plausible) to the multi-layer grid 42.

In some instances, each instance of the sensor plugin 44 includes a private grid layer that is not exported to the multi-layer grid 42. The electronic processor 34 may use the private grid layer to store and track measurements made by the sensor 22 in previous cycles. The electronic processor 34 may process the sensor information and determine the plausibility of the sensor information based on these measurements from previous cycles. For example, when the sensor information represents an object and previous measurements made by the sensor 22 also represent the object, the electronic processor 34 determines that the sensor information has a high plausibility and integrates the sensor information to the multi-layer grid 42.

In some instances, the electronic processor 34 identifies a particular layer in the multi-layer grid 42 into which the sensor information will be integrated. For example, when the sensor information represents a dynamic object, the electronic processor 34 integrates the sensor information to a dynamic layer of the multi-layer grid 42. In contrast, when the sensor information represents a static object, the electronic processor 34 integrates the sensor information to a static layer of the multi-layer grid 42. The electronic processor 34 may use known techniques to classify detected objects, wherein the electronic processor 34 uses such classifications to determine whether a detected object is a dynamic object or a static object. Alternatively or in addition, the electronic processor 34 may determine that an object is dynamic based on changes to the detected object over time.

Figure 4:
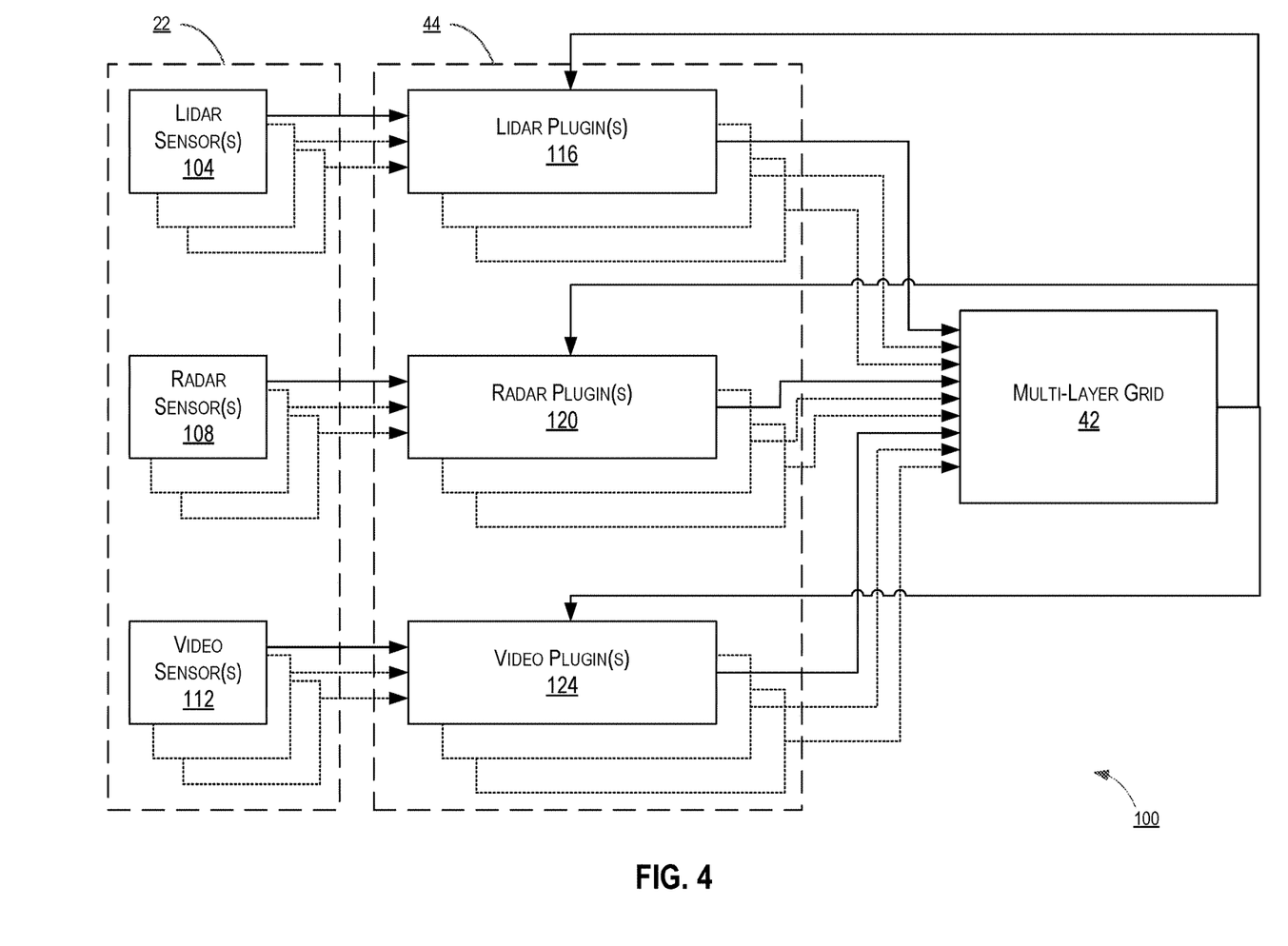
FIG. 4 illustrates an example sensor configuration for implementing the method of FIG. 3.

FIG. 4 schematically illustrates an example configuration of the sensors 22 for which the method 50 may be implemented. The plurality of sensors 22 may include one or more lidar sensors 104 configured to output lidar data, one or more radar sensors 108 configured to output radar data, and one or more video sensors 112 (e.g., cameras) configured to output video data. The system 100 also includes each instance of the multi-instanceable sensor plugin 44. For example, for each of the lidar sensors 104, the electronic processor 34 generates an instance of a lidar plugin 116. For each of the radar sensors 108, the electronic processor 34 generates an instance of a radar plugin 120. For each of the video sensors 112, the electronic processor 34 generates an instance of a video plugin 124. The system 100 further includes the multi-layer grid 42. In some instances, the multi-layer grid 42 provides feedback to each instance of the sensor plugin 44, such that each instance of the sensor plugin 44 receives a repeatedly-updated multi-layer grid 42 including sensor information previously integrated from each of the plurality of sensors 22.

In some instances, the plurality of sensors 22 include predetermined groups of sensors, and the sensor plugin 44 is instantiated once for each group of sensors. For example, the electronic processor 34 may instantiate a first sensor plugin for processing sensor information from a first group of sensors, and instantiate a second sensor plugin for processing sensor information from a second group of sensors. The first group of sensors may include, for example, sensors of different modalities that output sensor information corresponding to overlapping or neighboring positions in the environment. The second group of sensors may include, for example, sensors of the same modality that output sensor information corresponding to overlapping or neighboring positions in the environment. In some instances, the sensor information output by sensors of the same group of sensors include the same timestamps or timestamps of negligible differences.

Referring now to the lidar plugin 116, the electronic processor 34 receives lidar data from the lidar sensor 104. The electronic processor 34 then performs, using the lidar plugin 116, lidar-specific processing on the lidar data. In some instances, the lidar-specific processing includes performing ray tracing on the lidar data. Based on the result of the ray tracing, the electronic processor 34 may determine using known techniques that the lidar data represents a dynamic object in the environment, a ghost effect, or a reflection. In response to determining that the lidar data represented a reflection, the electronic processor 34 may generate a model of the reflection and identify an object in the environment as a source of the reflection.

In some instances, the electronic processor 34 performs processing of the lidar data based on the mounting position of the lidar sensor 104, based on feedback received from the multi-layer grid 42, or a combination thereof. For example, when the electronic processor 34 determines that the lidar data represents an object at a particular position in the environment, the electronic processor 34 may determine that the lidar data is plausible based on a determination that a sensor at another mounting position also detected the object at that position in the environment. In some instances, the electronic processor 34 determines that the lidar data is plausible based on a determination, using feedback from the multi-layer grid 42, that a sensor of another modality also detected the object at that position in the environment.

Referring now to the radar plugin 120, the electronic processor 34 receives radar data from the radar sensor 108. The electronic processor 34 then performs, using the radar plugin 120, radar-specific processing on the radar data. In some instances, the electronic processor 34 resolves angular ambiguities in the radar data based on the mounting position of the radar sensor 108 and feedback from the multi-layer grid 42. For example, the electronic processor 34 may determine that the radar data represents an object measured from either a first angle or a second angle different from the first angle. When feedback from the multi-layer grid 42 includes a high plausibility measurement of the object, the electronic processor 34 may resolve the angular ambiguity of the radar data and determine that the first angle is plausible and the second angle is implausible. Accordingly, the electronic processor 34 may discard the implausible radar data and integrate the plausible radar data into an appropriate layer of the multi-layer grid 42.

In some instances, the radar data represents a radial velocity of an object. Based on the radial velocity, the electronic processor 34 may determine whether an object is stationary or moving. In response to determining that the object is stationary, the electronic processor 34 may integrate the radar data to a static layer of the multi-layer grid 42. In contrast, in response to determining that the object is moving, the electronic processor 34 may integrate the radar data to a dynamic layer of the multi-layer grid 42.

In some instances, the radar data may have poor vertical resolution, for example when detecting under-drivable structures or curbs. Based on feedback from the multi-layer grid 42, the electronic processor 34 may match the poor resolution radar data to structures already detected with high plausibility by sensors of other modalities.

In some instances, the electronic processor 34 performs ray tracing of the radar data, similar to that of the lidar data, in order to determine whether the radar data represents an object in the environment, a ghost object, or a reflection.

In some instances, the electronic processor 34 processes the radar data based on radar-specific quantities such as, for example, a radar cross section, a received power or signalto-noise ratio, or a combination thereof. In some instances, the electronic processor 34 stores radar-specific quantities in one or more private grid layers, and filters the radar-specific quantities are over time to determine the plausibility of the radar data over time, to classify the type of object observed, or a combination thereof.

Referring now to the video plugin 124, the electronic processor 34 receives video data from the video sensor 112. The electronic processor 34 then performs, using the video plugin 124, video-specific processing on the video data. For example, the video data may include both angular measurements and distance measurements of objects. The angular measurements may have high plausibility while the distance measurements have low plausibility. For example, the distance inaccuracy of a particular camera may increase quadratically as the distance from the measured object increases. Based on feedback from the multi-layer grid 42, the electronic processor 34 may match distance measurements included in the video data to known distance measurements already made by sensors of other modalities.

Thus, aspects herein provide systems and methods for a sensor plugin architecture for a grid map.

What is claimed is:

1. A system for an autonomous vehicle comprising:
   a memory configured to store a multi-layer grid and a multi-instanceable sensor plugin, wherein the multi-layer grid includes a dynamic layer and a static layer storing information associated with positions in an environment;
   a plurality of sensors each configured to output sensor information;
   an electronic processor configured to, for each sensor included in the plurality of sensors:
      determine a modality of the sensor,
      generate an instance of the sensor plugin based on the modality,
      receive the sensor information,
      process the sensor information with the instance of the sensor plugin,
      determine a plausibility of the sensor information, and
      in response to determining that the sensor information is plausible, integrate the sensor information to a selected layer of the multi-layer grid,
   wherein the electronic processor is further configured to control vehicle movement based on the multi-layer grid.

2. The system for an autonomous vehicle of claim 1, wherein the electronic processor is configured to
   process the sensor information with the instance of the sensor plugin by
      determining a mounting position of the sensor, and
      processing the sensor information based on the mounting position.

3. The system for an autonomous vehicle of claim 1, wherein
   the sensor information is associated with a position in the environment,
   the multi-layer grid includes an occupancy layer, the occupancy layer including occupancy information,
   wherein the electronic processor is configured to
      determine the plausibility of the sensor information based on the occupancy information associated with the position in the environment and the modality of the sensor.

4. The system for an autonomous vehicle of claim 1, wherein
   one of the plurality of sensors comprises at least one selected from a group consisting of a radar sensor and a lidar sensor, and
   wherein the electronic processor is configured to
      in response to determining the sensor modality is radar or lidar, process the sensor information with the instance of the sensor plugin by performing ray-tracing to determine that the sensor information is associated with a reflection, and
      in response to determining that the sensor information is associated with a reflection, identify an object in the environment as a source of the reflection.

5. The system for an autonomous vehicle of claim 1, wherein
   one of the plurality of sensors comprises a radar sensor, and wherein the electronic processor is configured to
      in response to determining the sensor modality is radar, process the sensor information with the instance of the sensor plugin by determining a radial velocity of an object sensed by the radar sensor, and
      in response to determining the radial velocity is greater than a threshold, integrate the sensor information into the dynamic layer of the multi-layer grid.

6. The system for an autonomous vehicle of claim 1, wherein
   one of the plurality of sensors comprises a camera, and wherein the electronic processor is configured to
      in response to determining the sensor modality is video, process the sensor information with the instance of the sensor plugin by determining a distance inaccuracy of the sensor information output by the camera, and
      determine the plausibility based on the distance inaccuracy.

7. The system for an autonomous vehicle of claim 1, wherein the electronic processor is configured to
   determine a mounting position of the sensor,
   determine a calibration error for the sensor based on the mounting position, wherein the calibration error is based on at least one selected from the group consisting of a change in azimuth angle and a change in elevation angle, and
   recalibrate the sensor based on the calibration error.

8. The system for an autonomous vehicle of claim 1, wherein the electronic processor is configured to
   generate a private grid layer for each instance of the sensor plugin, wherein the private grid layer is not exported to the multi-layer grid,
   integrate subsequent cycles of sensor information into the private grid layer,
   process the sensor information based on sensor information associated with a previous cycle,
   determine that the sensor information is plausible based on the sensor information associated with the previous cycle integrated into the private grid layer, and
   in response to determining that the sensor information is plausible, integrate the sensor information to a selected layer of the multi-layer grid.

9. The system for an autonomous vehicle of claim 1, wherein the electronic processor is configured to
   process the sensor information with the instance of the sensor plugin by
      time-filtering the sensor information.

10. The system for an autonomous vehicle of claim 1, wherein the multi-layer grid provides feedback to the instance of the sensor plugin such that the instance of the sensor plugin receives a repeatedly-updated multi-layer grid including sensor information previously integrated from the sensor.

11. A method for operating an autonomous vehicle, the method comprising:
- storing, in a memory, a multi-layer grid and a multi-instanceable sensor plugin, wherein the multi-layer grid includes a dynamic layer and a static layer storing information associated with positions in an environment;
- outputting, with a plurality of sensors, sensor information;
- with an electronic processor and for each sensor included in the plurality of sensors:
  - determining a modality of the sensor,
  - generating an instance of the sensor plugin based on the modality,
  - receiving the sensor information,
  - processing the sensor information with the instance of the sensor plugin,
  - determining a plausibility of the sensor information, and
  - in response to determining that the sensor information is plausible, integrating the sensor information to a selected layer of the multi-layer grid; and
- controlling, with the electronic processor, vehicle movement based on the multi-layer grid.

12. The method of claim 11, wherein
processing the sensor information with the instance of the sensor plugin includes
- determining a mounting position of the sensor, and
- processing the sensor information based on the mounting position.

13. The method of claim 11, wherein
the sensor information is associated with a position in the environment,
the multi-layer grid includes an occupancy layer, the occupancy layer including occupancy information,
and the method further comprises
- determining the plausibility of the sensor information based on the occupancy information associated with the position in the environment and the modality of the sensor.

14. The method of claim 11, wherein
one of the plurality of sensors comprises at least one selected from a group consisting of a radar sensor and a lidar sensor; and
the method further comprises
- in response to determining the sensor modality is radar or lidar, processing the sensor information with the instance of the sensor plugin by performing ray-tracing to determine that the sensor information is associated with a reflection, and
- in response to determining that the sensor information is associated with a reflection, identifying an object in the environment as a source of the reflection.

15. The method of claim 11, wherein
one of the plurality of sensors comprises a radar sensor, and the method further comprises
- in response to determining the sensor modality is radar, processing the sensor information with the instance of the sensor plugin by determining a radial velocity of an object sensed by the radar sensor, and
- in response to determining the radial velocity is greater than a threshold, integrating the sensor information into the dynamic layer of the multi-layer grid.

16. The method of claim 11, wherein
one of the plurality of sensors comprises a camera, and the method further comprises
- in response to determining the sensor modality is video, processing the sensor information with the instance of the sensor plugin by determining a distance inaccuracy of the sensor information output by the camera, and
- determining the plausibility based on the distance inaccuracy.

17. The method of claim 11, further comprising
- determining, with the electronic processor, a mounting position of the sensor,
- determining a calibration error for the sensor based on the mounting position, wherein the calibration error is based on at least one selected from the group consisting of a change in azimuth angle and a change in elevation angle, and
- recalibrating the sensor based on the calibration error.

18. The method of claim 11, further comprising
- generating a private grid layer for each instance of the sensor plugin, wherein the private grid layer is not exported to the multi-layer grid,
- integrating subsequent cycles of sensor information into the private grid layer,
- processing the sensor information based on sensor information associated with a previous cycle,
- determining that the sensor information is plausible based on the sensor information associated with the previous cycle integrated into the private grid layer, and
- in response to determining that the sensor information is plausible, integrate the sensor information to a selected layer of the multi-layer.

19. The method of claim 11, wherein
processing the sensor information with the instance of the sensor plugin includes time-filtering the sensor information to normalize the sensor information.

20. The method of claim 11, wherein the multi-layer grid provides feedback to the instance of the sensor plugin such that the instance of the sensor plugin receives a repeatedly-updated multi-layer grid including sensor information previously integrated from the sensor.

* * * * *